United States Patent [19]

Nakazawa et al.

[11] Patent Number: 4,804,164
[45] Date of Patent: Feb. 14, 1989

[54] FLOW CONTROL DEVICE

[75] Inventors: Masahiko Nakazawa, Tokyo; Kazuo Tsukada, Hasuda; Kazunori Suzuki, Urawa, all of Japan

[73] Assignee: Fujikin International, Inc., Osaka, Japan

[21] Appl. No.: 217,097

[22] Filed: Jul. 8, 1988

Related U.S. Application Data

[63] Continuation of Ser. No. 39,333, Apr. 17, 1987, abandoned.

[30] Foreign Application Priority Data

Apr. 18, 1986 [JP] Japan .................................. 61-90629

[51] Int. Cl.$^4$ ............................................. F16K 41/10
[52] U.S. Cl. ................................... 251/335.3; 251/254; 138/46
[58] Field of Search ...................... 138/40, 44, 45, 46; 251/297, 220, 254, 252, 335.3, 257; 137/625.36

[56] References Cited

U.S. PATENT DOCUMENTS

| | | | |
|---|---|---|---|
| 1,155,576 | 10/1915 | Isley | 251/252 |
| 2,105,864 | 1/1938 | Saunders | 251/335.3 |
| 2,114,139 | 4/1938 | Crosthwaith | 251/335.3 |
| 2,933,283 | 4/1960 | Kreis | 251/254 |
| 3,127,786 | 4/1964 | Wooley | 251/297 |
| 3,164,173 | 1/1965 | Semon | 251/254 |
| 3,787,023 | 1/1974 | Shufflebarger et al. | 251/335.3 |
| 4,201,366 | 5/1980 | Danko et al. | 251/335.3 |

Primary Examiner—James E. Bryant, III
Attorney, Agent, or Firm—Armstrong, Nikaido, Marmelstein & Kubovcik

[57] ABSTRACT

A flow control device comprising a spindle having a disk at its lower end and a handle at its upper end and spring-biased to bring the disk into pressing contact with a disk seat within a case, a closure having a top wall, and at least one rollable member resting on the upper surface of the closure top wall and mounted on the spindle at an upper end portion thereof projecting upward from the upper surface of the closure top wall. The closure is formed in the upper surface of its top wall with a lower recessed portion for the rollable member to partly fit in, an upper recessed portion for the rollable member to partly fit in and a slanting guide face between the two recessed portions. The rollable member is movable by the rotation of the handle to partly fit into the lower recessed portion to thereby hold the disk in pressing contact with the disk seat or to partly fit into the upper recessed portion to thereby hold the disk away from the disk seat.

2 Claims, 2 Drawing Sheets

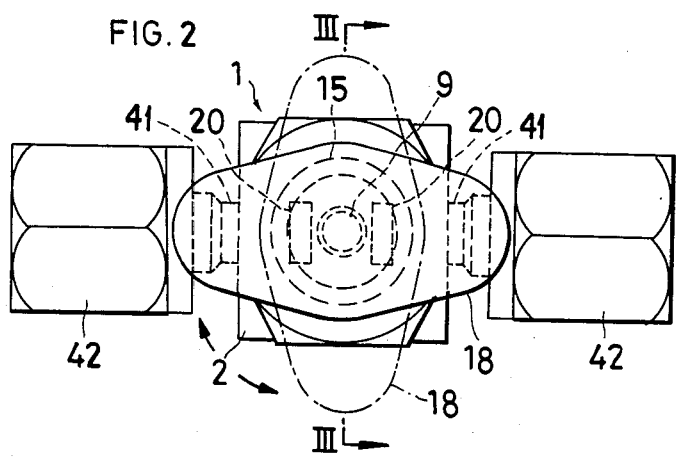
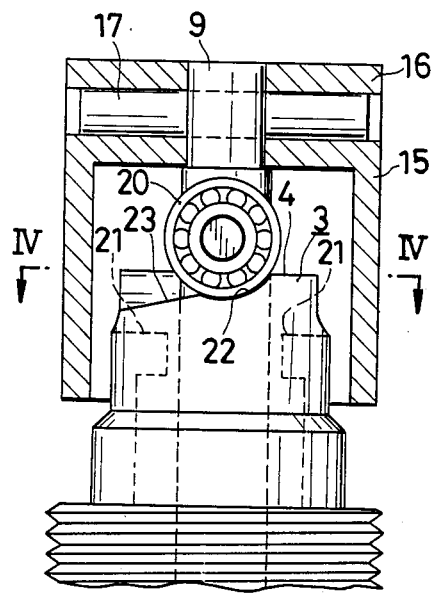
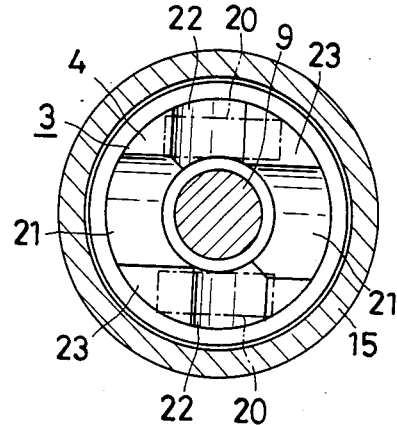
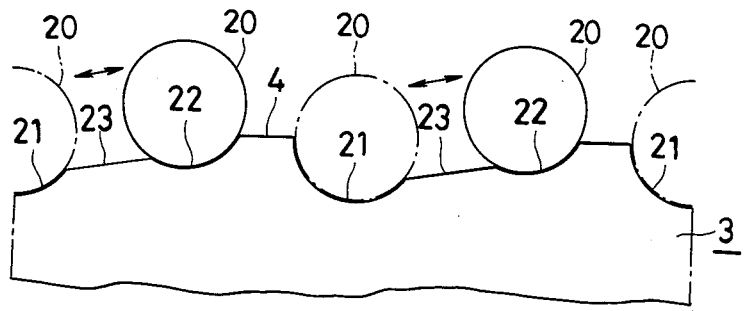

FLOW CONTROL DEVICE

This application is a continuation of application Ser. No. 039,333 filed Apr. 27, 1987, now abandoned.

BACKGROUND OF THE INVENTION

The present invention relates to a flow control device.

Conventional flow control devices comprise, for example, a spindle having a handle at its upper end, a disk and an externally threaded portion in screw-thread engagement with an internally threaded portion of a case having a disk seat therein. The disk is pressed against the seat or moved away therefrom by rotating the handle to close or open a flow channel extending through the case. However, the device has the problem that the seal face of the disk becomes indented during use for a long period of time, displacing the handle when the disk is closed, or that the disk closing handle position changes owing to a machining error involved in the fabrication of the device, consequently influencing the opening-closing operation of the device. Further with the conventional device, it is likely that the operator will tighten up the handle excessively to produce an indentation in or cause damage to the seal face of the disk, thereby aggravating the above problem.

SUMMARY OF THE INVENTION

The main object of the present invention is to overcome these problems and to provide a flow control device.

More specifically, the present invention provides a flow control device which comprises a spindle having a disk at its lower end and a handle at its upper end and spring-biased to bring the disk into pressing contact with a disk seat within a case, a closure having a top wall, and at least one rollable member resting on the upper surface of the closure top wall and mounted on the spindle at an upper end portion thereof projecting upward from the upper surface of the closure top wall. The closure is formed in the upper surface of its top wall with a lower recessed portion for the rollable member to partly fit in, an upper recessed portion for the rollable member to partly fit in and a slanting guide face between the two recessed portions. The rollable member is movable by the rotation of the handle to partly fit into the lower recessed portion to thereby hold the disk in pressing contact with the disk seat or to partly fit into the upper recessed portion to thereby hold the disk away from the disk seat.

According to the present invention, the disk on the spindle can be pressed into contact with the disk seat under a constant pressure at all times, reliable closing the flow channel through the case. Moreover, the seal face of the disk is less susceptible to wear or damage. This obviates the likelihood that the disk closing handle position will change during a long period of use, giving outstanding durability to the device.

BRIEF DESCRIPTION OF THE DRAWINGS

FIG. 2 is a plan view of the same;

FIG. 3 is a fragmentary enlarged view in section taken along the line III—III in FIG. 2;

FIG. 4 is an enlarged view in section taken along the line IV—IV in FIG. 3; and

FIG. 5 is a side elevation in development showing the top wall portion of a closure.

DESCRIPTION OF THE PREFERRED EMBODIMENT

Figure 1:
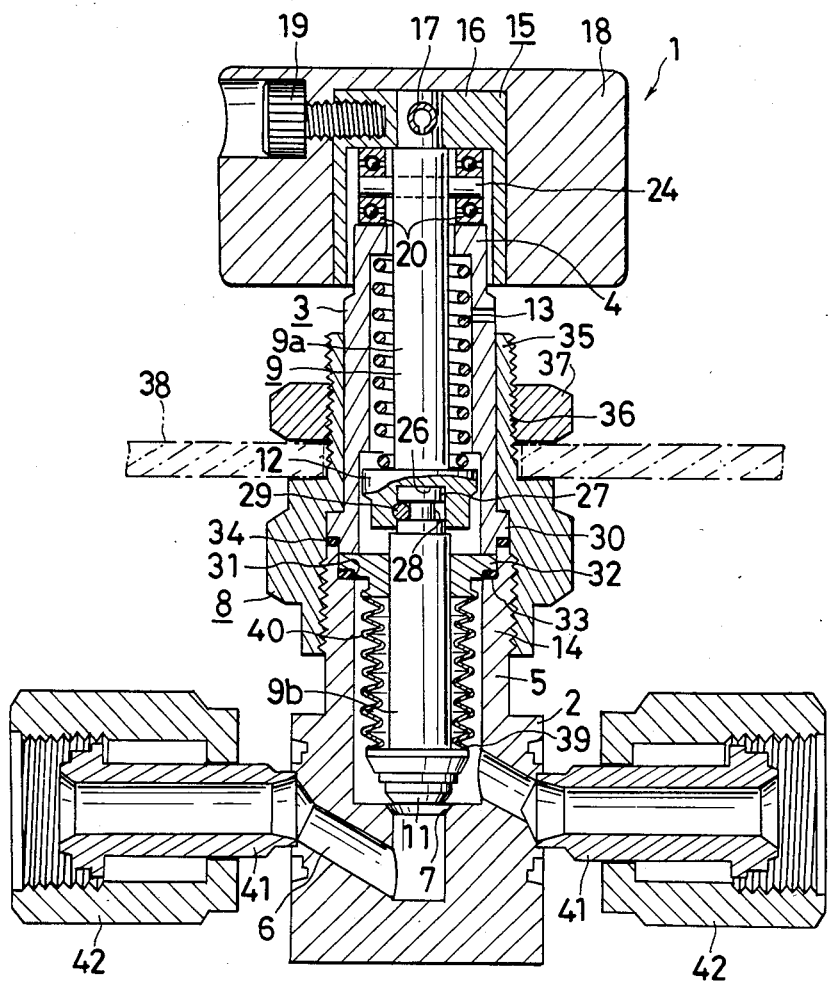
FIG. 1 is a view in vertical section showing a flow control device embodying the invention.

With reference to FIGS. 1 and 2, the flow control device 1 shown comprises a case 2 which has a fluid flow channel 6, a disk seat 7 and a tubular portion 5 having an externally threaded upper end portion 14. A closure 3 having a top wall 4 is mounted on the upper end of the tubular portion 5 by a connecting nut 8. A spindle 9 comprises an upper spindle member 9a extending through the closure top wall 4 and having an upper end portion projecting upward therefrom, and a lower spindle member 9b rotatably connected to the lower end of the upper spindle member 9a by a connecting pin 29 and having a disk 11 at its lower end. An annular spring support 12 is attached to the lower end of the upper spindle member 9a. A coiled spring 13 provided around the upper spindle member 9a is interposed between the spring support 12 and the closure top wall 4 for biasing the spindle 9 downward, whereby the disk 11 at the lower end of the spindle 9 is pressed into contact with the disk seat 7.

A short cylindrical housing 15 having a top wall 16 is fitted over the upper end portion of the upper spindle member 9a. A spring pin 17 is inserted in a bore horizontally extending straight through the upper end portion of the upper member 9a and the top wall 16 of the housing 15, whereby the housing 15 is held to the upper spindle member 9a unremovably. A handle 18, which is generally elliptical when seen from above, is fitted over the housing 15 and fixed thereto with a bolt 19 having a hexagonal socket head. The spring support 12 at the lower end of the upper spindle member 9a has a downwardly open socket 26 having the head 27 of the lower spindle member 9b inserted therein. An annular groove 28 is formed in the head 27 of the lower spindle member 9b. The aforementioned connecting pin 29, extending horizontally, is partly fitted in the groove 28 and supported at its opposite ends by the spring support 12, whereby the lower spindle member 9b is connected to the upper spindle member 9a rotatably relative thereto.

A pair of rollable members 20, each comprising a ball bearing, for lifting and lowering the spindle 9 are mounted in a vertical position by a horizontal pin 24 on the upper spindle member 9a at a portion thereof close to its upper end. These rollable members 20 rest on the upper surface of the closure top wall 4.

As shown in greater detail in FIGS. 3 to 5, the top wall 4 of the closure 3 is formed in its upper surface with a lower recessed portion 21 for the rollable member 20 to partly fit in, an upper recessed portion 22 positioned 90 degrees away from the portion 21 about the axis of the closure 3 for the rollable member 20 to partly fit in, and a slanting guide face 23 between the two recessed portions 21, 22. The top wall surface has another set of such recessed portions 21, 22 and guide face 23. By the rotation of the handle 18, the two rollable members 20, 20 are moved and partly fitted into the lower recessed portions 21, 21, respectively, to thereby hold the disk 11 in pressing contact with the disk seat 7, or are partly fitted into the upper recessed portions 22, 22, respectively, to thereby hold the disk 11 away from the seat 7. With the present embodiment, therefore, the disk 11 is lifted or lowered to open or close the fluid flow channel 6 every time the handle 18 is rotated through 90 degrees.

The spindle 9 may be provided with only one rollable member 20. In this case, the angle of rotation of the handle 18 can be determined suitably by spacing the lower and upper recessed portions 21, 22 by a suitable distance, and at least one set of lower and upper recesses 21, 22 and intermediate slanting guide face 23 may be formed.

An annular stepped portion 31 is formed in the upper end of the tubular portion 5 of the case 2 inside thereof. A ring 32 for attaching a sealing tube 40 in the form of bellows is fitted to the stepped portion 31 with a gasket 33 provided therebetween. The lower end of the closure 3 is placed on the ring 32. The closure 3 and the tubular portion 5 are joined to each other by the connecting nut 8, with a gasket 34 interposed between a flange 30 on the closure 3 and the upper end of the tubular portion 5. A tubular portion 35, externally threaded as at 36, extends upward from the upper end of the connecting nut 8. A nut 37 for fastening the flow control device 1 to a panel 38 is screwed on the externally threaded portion 36. The lower spindle member 9b has an annular projection 39 close to its lower end for attaching the sealing tube 40. The bellows-shaped sealing tube 40 is fitted around the lower spindle member 9b and welded at its upper and lower ends to the ring 32 and to the projection 39. A pipe connecting sleeve 41 having a union nut 42 is attached to each of opposite side walls of the case 2.

The operation of the flow control device 1 will be described in detail. When the device 1 is in closed state, the rollable members 20 mounted on the spindle 9 are fitted in the lower recesses 21 in the upper surface of the closure top wall 4. When the handle 18 is rotated counterclockwise through 90 degrees from this state to the solid-line position of FIG. 2, the upper spindle member 9a rotates with the handle 18, causing the two rollable members 20 to ascend the slanting guide faces 23 and fit into the upper recessed portions 22 and thereby lifting the spindle 9 against the force of the spring 13. Consequently, the disk 11 is moved away from its seat 7 to open the fluid flow channel 6. The channel 6 is closable from this state by reversely rotating the handle 18 clockwise through 90 degrees.

The flow channel 6 is opened or closed by the device 1 under the action of the spring 13 instead of resorting to the screwing action utilized in the conventional device, with the result that the disk 11 and the sealing face of the seat 7 are not subjected to a force greater than is needed. This greatly reduces the wear of or damage to the seal face, further eliminating the likelihood that the handle closing position will change owing to damage or indentation of the seal face or to a dimensional error. Since the rollable member 20 will not stop at an intermediate portion of the slanting face 23, the disk 11 can be opened or closed by the handle 18 properly at all times. Because the rollable member 20 is adapted to fit into the lower and upper recessed portions 21, 22 which are similar to the member 20 in radius of curvature, a click and feel to the handle gripping hand indicate that the member 20 has been brought to its stopped position. The bearing serving as the rollable member 20 according to the present embodiment is especially less prone to abrasion and serviceable for a prolonged period of time. The flow channel 6 is openable by rotating the handle 18 in a direction to compress the spring 13, so that the handle 18 is heavier when it is rotated toward the opening direction. This obviates the possible damage to the bellows-shaped sealing tube 40 provided around the lower spindle member 9b. The handle 18 is fixed by the bolt 19 to the housing 15, which in turn is attached to the upper end of the spindle by a spring pin 17. Whereas the bolt heretofore directly screwed into the spindle is likely to cause damage to the spindle, the above arrangement obviates the possibility of causing such damage, holding the spindle 18 in position without any play or slipping off even when it is used repeatedly. The ball bearing serving as the rollable member 20 is covered with the housing 15 and therefore remains free from dust or the like when the device 1 is being attached to the panel 38, hence safety and no likelihood of some parts becoming lost.

The rollable member 20, which comprises a ball bearing according to the embodiment described, may be some other roller.

What is claimed is:

1. A flow control device comprising a case having a disk seat and a tubular portion, a closure mounted to said tubular portion of said case, said closure having a top wall, a spindle including an upper spindle member and a lower spindle member, means connecting said upper and lower spindle members for axial movement together while permitting said lower spindle member to rotate relative to said upper spindle member, a disk at the lower end of said lower spindle member and adapted to engage said disk seat, an annular spring support attached to a lower end of said upper spindle member, an aperture through the top wall of said closure, said upper spindle member having an upper end projecting through said aperture, a short cylindrical housing having an upper end wall and fitted over said upper end of said upper spindle member by means of an aperture through said upper end wall, a bore extending through said upper end wall of said housing and said upper end of said upper spindle member, means extending through said bore and securing said housing to said upper spindle member, a handle having a central bore adapted to fit over said housing, axially aligned bores in said housing and said handle, a bolt seated in said bore through said handle and securing said handle to said housing, at least one spindle lifting and lowering ball bearing mounted to said upper end portion of said spindle, said lifting and lowering ball bearing being located internally of said short cylindrical housing and resting for rolling movement on an upper surface of the top wall of said closure, said upper surface of the top wall of said closure having formed therein a lower recessed portion to partially receive said ball bearing, an upper recessed portion to partially receive said ball bearing, and a slanting guide surface between the two recessed portions, a coil spring for biasing the spindle downward to bring the disk into pressing contact with the disk seat, said coil spring being provided around upper spindle member internally of said closure and interposed between said annular spring support and said top wall of said closure, an annular stepped portion formed internally of the upper end of said tubular portion of said case, a ring fitted to said annular stepped portion, an annular projection adjacent to the lower end of said lower spindle member, a bellows type sealing tube provided internally of said case, said bellows type sealing tube being welded at one end to said annular projection adjacent the lower end of the lower spindle member and at the other end to said ring to thereby seal said lower spindle member, said lifting and lowering ball bearing being movable on the upper surface of the top wall of said closure by rotation of said handle to partially fit said ball bearing into said lower recessed portion and thereby permit said coil spring to hold said disk in pressing contact with said disk seat or to partially fit into said upper recessed portion to compress said coil spring and thereby hold said disk away from said disk seat.

2. A flow control device as defined in claim 1 wherein the upper end portion of the spindle is provided with two ball bearings diametrically opposed to each other and located for rolling movement on the upper surface of said top wall, a lower recessed portion, a upper recessed portion and a slanting guide surface are provided for each of said two ball bearings, the upper recessed portion and the lower recessed portion for each respective ball bearing being spaced from each other by an angle of 90 degrees around the axis of the closure and said upper recessed portions are aligned with the direction of flow through said device whereby an elongated axis of said handle is oriented in the direction of flow through said device to indicate an open position of said device when said two ball bearings are partly fitted in said upper recessed portions and a closed position of said device when said two ball bearings are partly fitted in said lower recessed portions.

* * * * *